(12) United States Patent
Hsu

(10) Patent No.: US 12,025,792 B2
(45) Date of Patent: Jul. 2, 2024

(54) SLEEVE FOR ABSORBING MOISTURE FROM LENS

(71) Applicant: Tsang-Hung Hsu, Tainan (TW)

(72) Inventor: Tsang-Hung Hsu, Tainan (TW)

( * ) Notice: Subject to any disclaimer, the term of this patent is extended or adjusted under 35 U.S.C. 154(b) by 705 days.

(21) Appl. No.: 17/232,533

(22) Filed: Apr. 16, 2021

(65) Prior Publication Data
US 2022/0334382 A1 Oct. 20, 2022

(51) Int. Cl.
*G02B 27/00* (2006.01)
*G03B 17/56* (2021.01)

(52) U.S. Cl.
CPC ........ *G02B 27/0006* (2013.01); *G03B 17/56* (2013.01)

(58) Field of Classification Search
None
See application file for complete search history.

(56) References Cited

U.S. PATENT DOCUMENTS

| 10,268,102 | B2 | 4/2019 | Decker | |
|---|---|---|---|---|
| 2012/0201031 | A1* | 8/2012 | Marley | F21S 41/153 359/512 |

* cited by examiner

*Primary Examiner* — Jennifer D. Carruth
(74) *Attorney, Agent, or Firm* — Rosenberg, Klein & Lee

(57) ABSTRACT

A sleeve for absorbing moisture from lenses is revealed. A sleeve body is divided into an upper space and a lower space for mounting a lens by a partition. A mounting cavity in which a moisture absorption material is disposed is in the upper space. An upper cover with a moisture detecting unit is fastened on an open end of the mounting cavity. The lower space provides a stretchable space to have a tight fit on the lens with different sizes. The moisture absorption range of the moisture absorption material extends to the periphery of the lens through air channels so that the moisture absorption material absorbs moisture from the lens through gaps of a lens end, a focus ring, and an iris ring of the lens for keeping the lens dry. The moisture detecting unit allows users to replace or treat the moisture absorption material in time.

16 Claims, 5 Drawing Sheets

SLEEVE FOR ABSORBING MOISTURE FROM LENS

BACKGROUND OF THE INVENTION

Field of the Invention

The present invention relates to a sleeve for absorbing moisture from lenses, especially to a sleeve which is used for absorbing moisture from lenses and having air channels inside for improving moisture absorption.

Description of Related Art

Damp is one of the most common issues we have in our daily lives or in business. During humid seasons, high humidity not only makes people feel quite uncomfortable but also causes damages to various kinds of products in lives such as USB plugs, cameras, lenses, cosmetics, leather, jewellery, stamp albums, drugs, etc. The delicate products require more humidity protection.

For example, a camera lens which is an assembly of precision optical lenses should be stored at the optimum relative humidity (RH) of 35% to 45%. Excess humidity is destructive to cameras due to fungus and mold inside the lens or optical elements so that preventing fungus and mold on optical instruments is essential to optical performance. Moreover, while the camera is used outdoors in different climates, moisture may infiltrate into the lens through the focus ring and the iris ring. Temperature change can also lead to moisture building up in the camera. For instance, the camera is used in a cold environment outdoor and then moved to indoor, the changes in temperature and moisture create condensation on the surface of the camera or the inside of the lens. Thus products that remove moisture in the camera surface and the lens are required.

Refer to U.S. Pat. No. 10,268,102, a protective cap for tubular-shaped objects is revealed. The protective cap includes a base member having an outer surface and an inner surface, and a sidewall extending rearwardly from the base member, the sidewall having an outer surface and an inner surface; wherein the inner surface of the base member and the inner surface of the sidewall define a cavity for receiving an end of a tubular-shaped object; wherein the outer surface of the base member and the outer surface of the sidewall define a contiguous outer surface; wherein the contiguous outer surface has at least one bumper and at least one stretch channel; wherein the at least one stretch channel has a first thickness; wherein the at least one bumper has a second thickness; wherein the first thickness is less than the second thickness; wherein a difference between the first thickness and the second thickness is between 0.3 and 2.0 millimeters.

The protective cap fits on objects having different diameters such as lenses by a thinner stretch channel which stretches and slips over the lenses. The thicker bumper provides improved protection against impacts. Moreover, the protective cap prevents impurities from falling into the lens. However, while the protective cap is removed during outdoor shooting in different climates, moisture may already infiltrate into the lens and unable to be removed by the protective cap. The closed protective cap even keeps the moisture in the lens and cause fungus and mold to grow on lenses in the camera.

Thus there is room for improvement and there is a need to provide a sleeve for absorbing moisture from lenses.

SUMMARY OF THE INVENTION

Therefore it is a primary object of the present invention to provide a sleeve which is used for absorbing moisture from lenses and having air channels inside for better moisture absorption.

In order to achieve the above object, a sleeve for absorbing moisture from lenses according to the present invention mainly includes a sleeve body, a moisture absorption material, an upper cover, and a moisture detecting unit. The sleeve body is divided into an upper space and a lower space by a partition while the lower space is for mounting a lens. A mounting cavity is formed in the upper space and the moisture absorption material is disposed in the mounting cavity while the upper cover with the moisture detecting unit is fastened on an open end of the mounting cavity. The lower space made of elastic material provides a stretchable space to have a tight fit on the lens with different sizes. The elastic material also protects the lens against impacts. The moisture absorption range of the moisture absorption material extends to the periphery of the lens through the air channels in the sleeve body so that the moisture absorption material absorbs moisture from the lens through gaps of a lens end, a focus ring, and an iris ring of the lens for keeping the lens dry. Users can learn the level of moisture by the moisture detecting unit in the sleeve body and further replace or regenerate the moisture absorption material to maintain the moisture absorption capacity and provide good and constant moisture protection.

A plurality of protruding ribs are mounted to an inner surface of the lower space of the sleeve body and extending to the bottom surface of the partition while an air channel forms between the two adjacent protruding ribs.

A filter paper and a plurality of protruding pins are mounted to a surface of an upper end of the partition while a plurality of mounting holes are formed on a surface of the bottom end of the mounting cavity at the positions corresponding to the protruding pins. Thereby the protruding pins insert through the mounting holes and the filter paper to abut against the moisture absorption material. The filter paper not only has micropores for allowing air to pass through but also prevents dust of the moisture absorption material falling from the mounting cavity into the lower space in which the lens is mounted. Thereby the lens will not be damaged by the dust of the moisture absorption material.

A first fastening portion and a second fastening portion are disposed on a seat while a first assembly portion is arranged at the upper space and the upper cover is provided with a second assembly portion. The first fastening portion and the second fastening portion are connected to the first assembly portion and the second assembly portion respectively by threaded connection or locked connection.

The lower space of the sleeve body is made of elastic material (such as silicone or rubber) so as to have a tight fit on the lens with different sizes firmly by the elasticity.

The moisture absorption material is either a block formed by molding of porous powder blended with adhesives or a breathable bag mounted with moisture absorbers therein.

The moisture detecting unit can be a moisture meter or a small piece with a chemical agent which changes color in response to humidity such as cobalt (II) chloride ($CoCl_2$).

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENT

In order to learn technical content and functions of the present invention more completely and clearly, please refer to the following embodiments with detailed descriptions together with the related figures and numbers therein.

Figure 1:
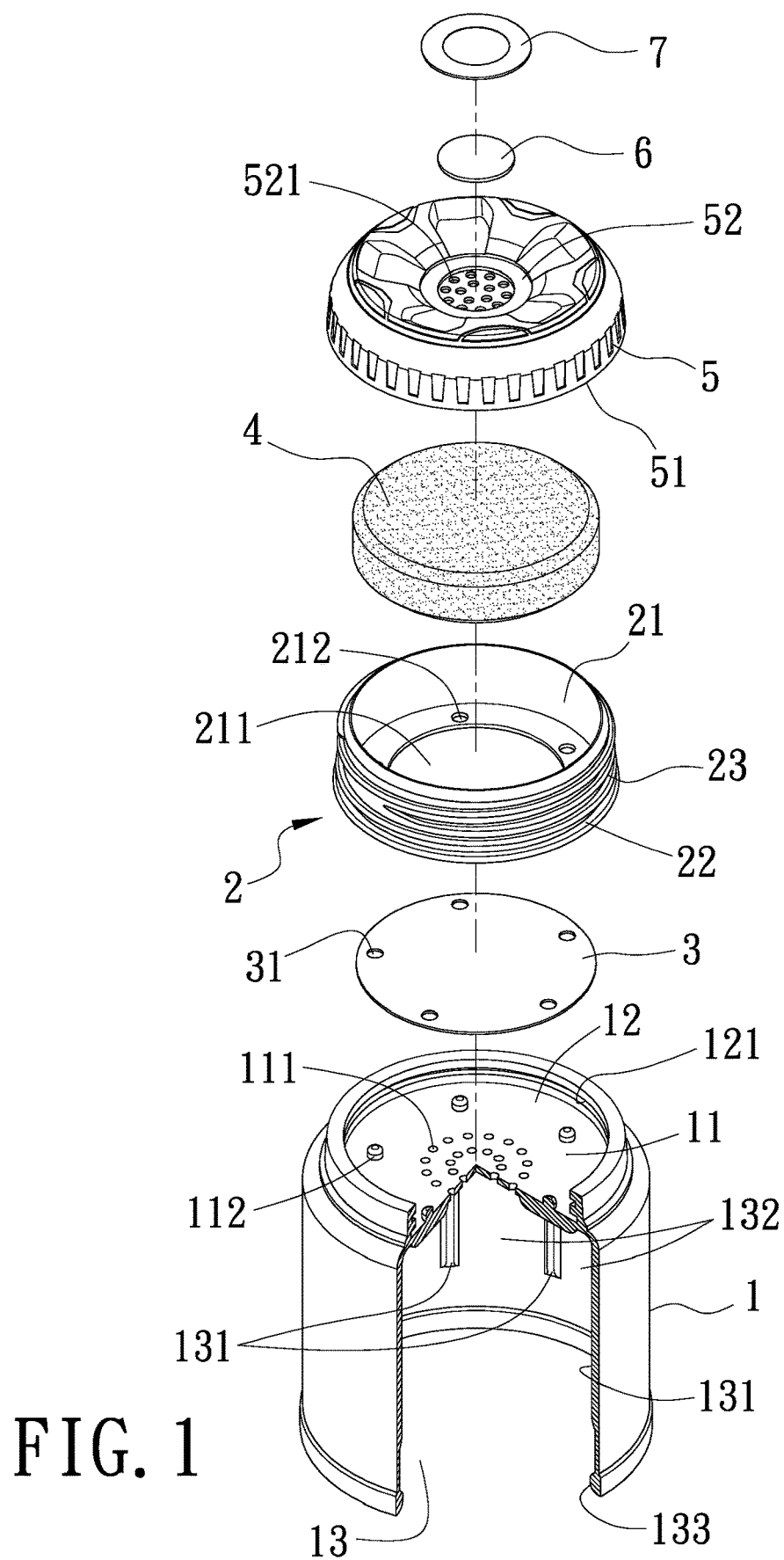
FIG. 1 is an explosive view of an embodiment according to the present invention.
Figure 2:
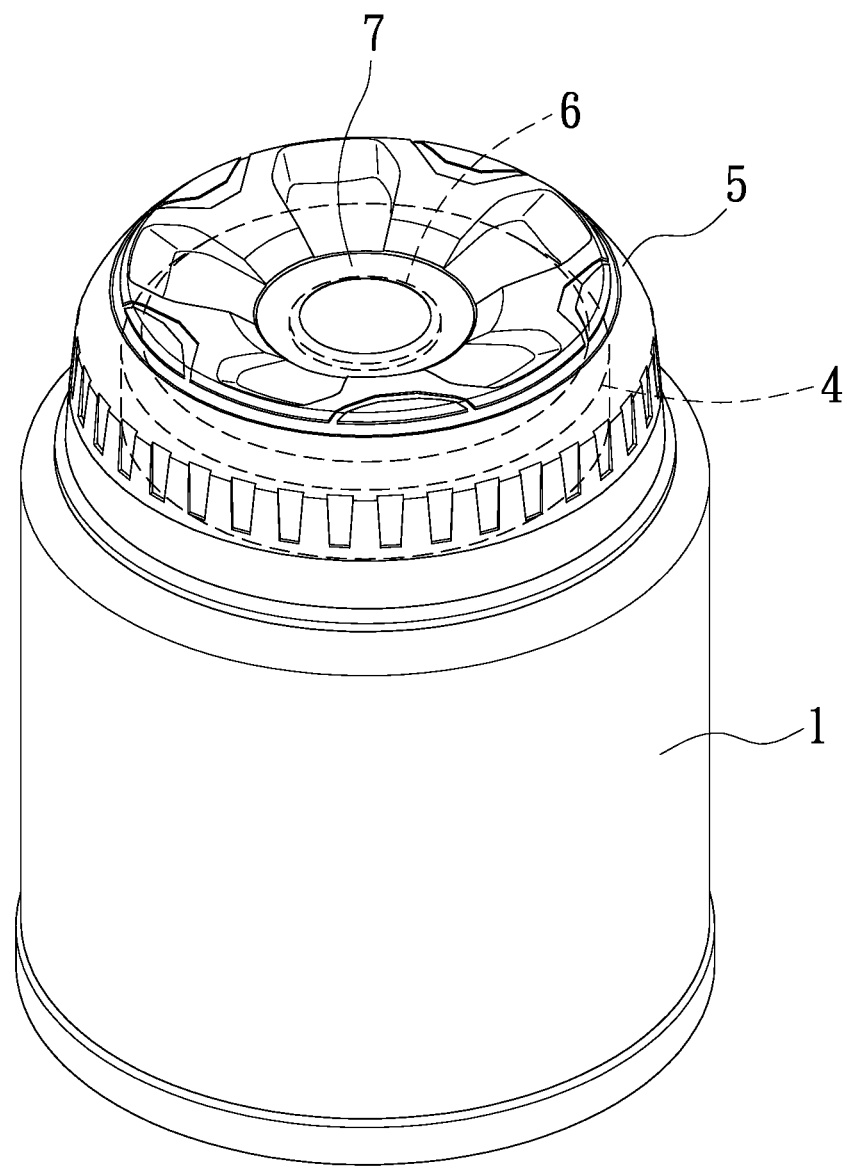
FIG. 2 is a perspective view of an embodiment according to the present invention.
Figure 3:
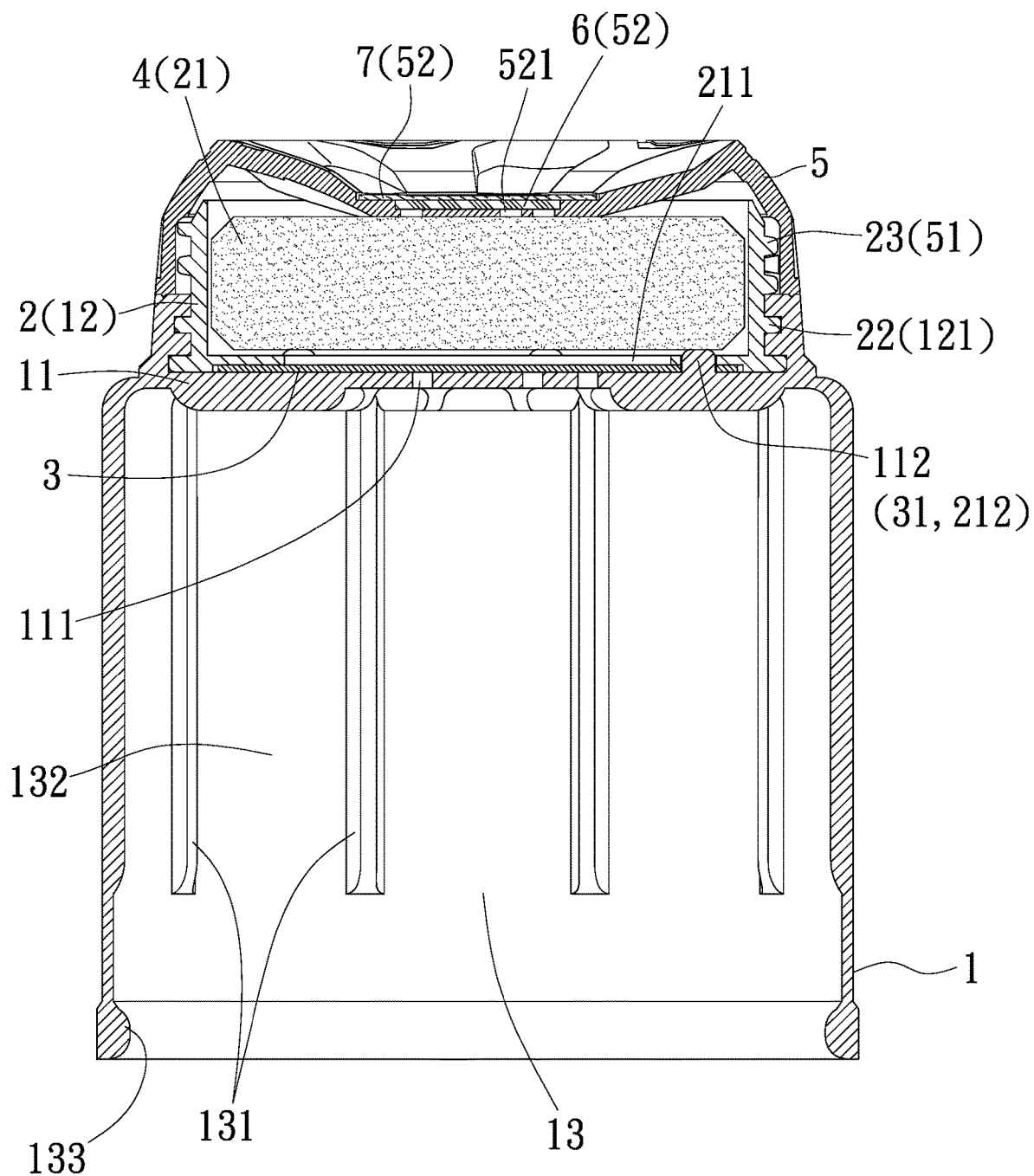
FIG. 3 is a sectional view of an embodiment according to the present invention.
Figure 4:
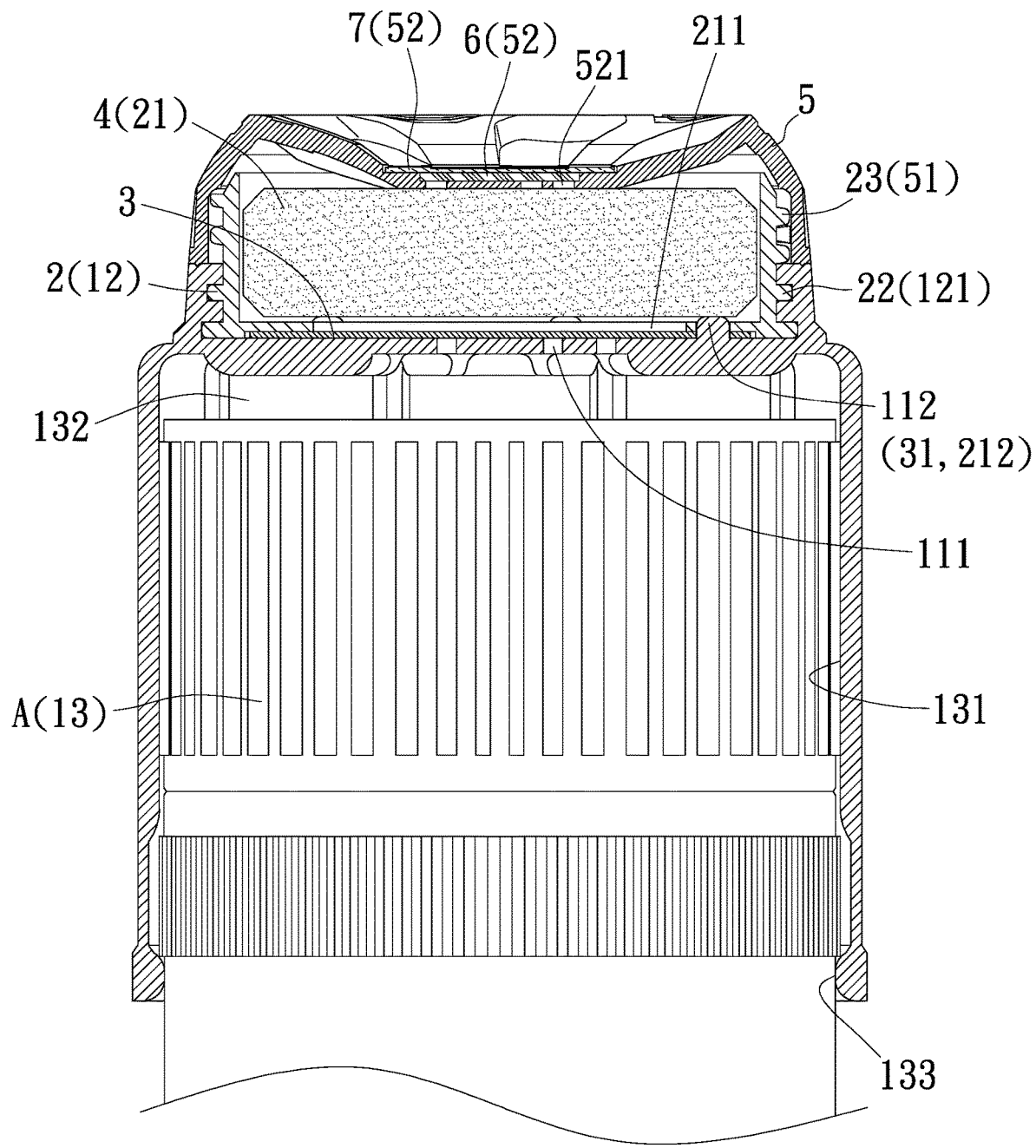
FIG. 4 is a sectional view of an embodiment in use according to the present invention.

Refer to FIG. 1, a sleeve for absorbing moisture from lenses mainly includes a sleeve body 1, a seat 2, a moisture absorption material 4, a filter paper 3, an upper cover 5, a moisture detecting unit 6, and a nameplate 7.

One end of the sleeve body 1 is provided with a partition 11 for dividing the sleeve body 1 into an upper space 12 and a lower space 13. A plurality of through holes 111 are arranged at the partition 11 and communicating with both the upper space 12 and the lower space 13. A first assembly portion 121 is disposed on the circumference of the upper space 12 while the lower space 13 is for mounting a lens A therein.

A mounting cavity 21 is mounted in the upper space 12 of the sleeve body 1 and is able to be formed in the seat 2 while an opening 211 is arranged at the bottom of the seat 2. A first fastening portion 22 and a second fastening portion 23 are disposed on the periphery of the seat 2. The first fastening portion 22 is connected to the first assembly portion 121 correspondingly.

The moisture absorption material 4 which is either a block formed by molding of porous powder blended with adhesives or a breathable bag mounted with moisture absorbers therein is mounted in the mounting cavity 21 formed at the seat 2.

The filter paper 3 is disposed over the through holes 111 of the partition 11 to cover the through holes 111 for preventing dust of the moisture absorption material 4 from falling into the lower space 13 mounted with the lens A through the through holes 111 and the opening 211.

The upper cover 5 which covers an open end of the mounting cavity 21 is provided with a second assembly portion 51 on an inner surface of the periphery thereof and a step-shaped slot 52. The second assembly portion 51 is connected to the second fastening portion 23 correspondingly while a plurality of insertion holes 521 are disposed on a surface of one end of the step-shaped slot 52.

Figure 5:
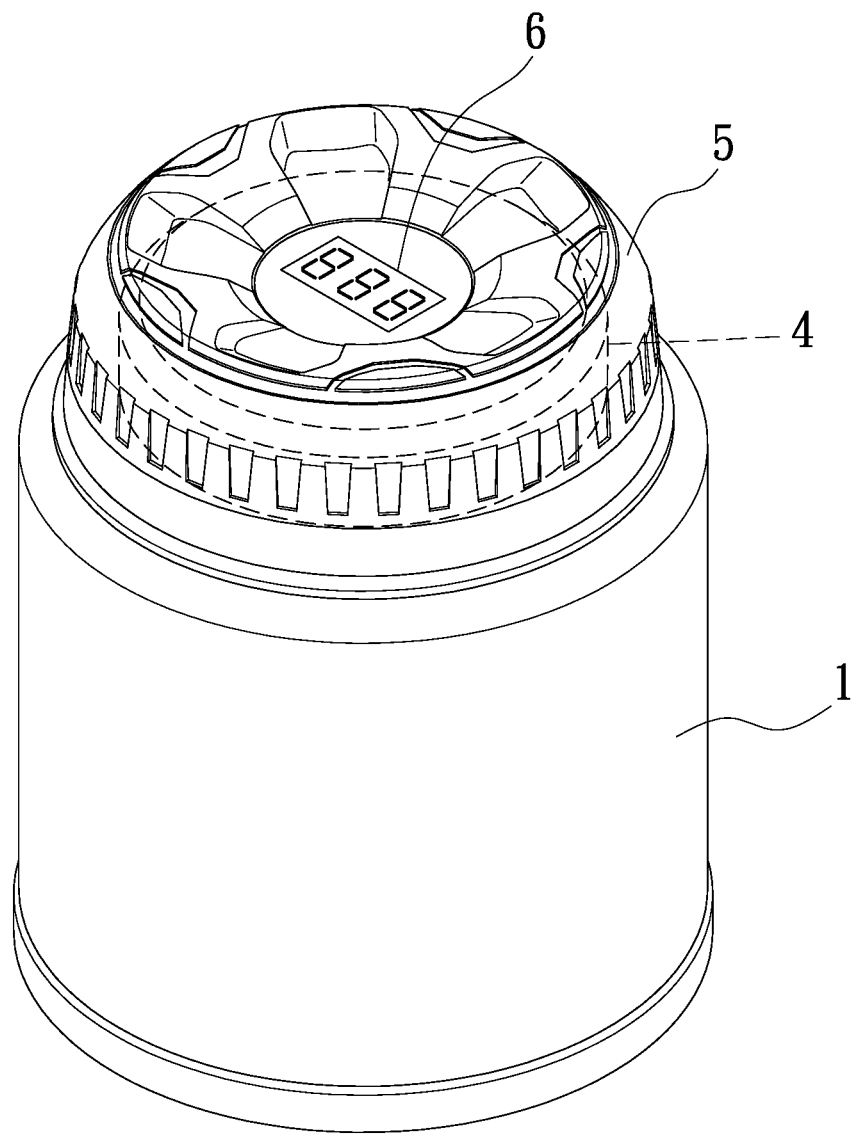
FIG. 5 is a perspective view of another embodiment (with a moisture meter) according to the present invention.

The moisture detecting unit 6 which is mounted in the step-shaped slot 52 and covers the insertion holes 521 can be a moisture meter (as shown in FIG. 5) or a small piece (as shown in FIG. 1) with a chemical agent which changes color in response to humidity such as cobalt (II) chloride ($CoCl_2$).

The nameplate 7 is disposed over the moisture detecting unit 6 for sealing the step-shaped slot 52.

While in use, as shown in FIG. 1-4, the lower space 13 of the sleeve body 1 made of elastic material (such as silicone or rubber) provides a stretchable space to have a tight fit on the lens A with different diameters and length by its elasticity. The lower space 13 includes a plurality of protruding ribs 131, a plurality of air channels 132, and a seal ring 133. The seal ring 133 is arranged around an opening of the lower space 13 of the sleeve body 1 so that the lower space 13 becomes a closed space after being connected with the lens A. The protruding ribs 131 are mounted to an inner surface of the lower space 13 of the sleeve body 1 and extending to the bottom surface of the partition 11. While the protruding ribs 131 are in contact with and fit around the periphery of the lens A, the air channel 132 forms between the two adjacent protruding ribs 131. The air channel 132 passes through the partition 11, the through holes 111, the filter paper 3, and the opening 211 and further communicates with the mounting cavity 21. Thereby moisture absorption range of the moisture absorption material 4 in the mounting cavity 21 is extending to the periphery of the lens A through the air channels 132 so that the moisture absorption material 4 can absorb moisture from the lens A through gaps of a lens end, a focus ring, and an iris ring of the lens A.

A plurality of protruding pins 112 are mounted to a surface of one end of the partition 11 while a plurality of holes 31 are arranged at the filter paper 3 at the positions corresponding to the protruding pins 112. While being assembled, the holes 31 of the filter paper 3 are mounted to the protruding pins 112 and then the seat 2 with the mounting cavity 21 is mounted into the upper space 12 of the sleeve body 1 through the first fastening portion 22 and the first assembly portion 121 joined by threaded connection or locked connection. Next the moisture absorption material 4 is placed into the mounting cavity 21. In order to make air inside flow smoothly and help absorb moisture, the protruding pins 112 abut against the moisture absorption material 4 for raising the moisture absorption material 4 higher. When the opening 211 is smaller than the area the protruding pins 112 distributed, a plurality of mounting holes 212 are formed on a surface of the bottom end of the mounting cavity 21 for allowing the protruding pins 112 to insert through and further abut against the moisture absorption material 4. Thereby the moisture absorption material 4 is raised to increase contact area between the bottom of the moisture absorption material 4 and air for increasing moisture absorption. The protruding pins 112 made of soft material also used for impact protection between the moisture absorption material 4 and the mounting cavity 21.

Next the upper cover 5 is connected to the open end of the mounting cavity 21 firmly through the second assembly portion 51 of the upper cover 5 and the second fastening portion 23 of the seat 2 joined by threaded connection or locked connection. At last, the moisture detecting unit 6 is h is mounted in the step-shaped slot 52 of the upper cover 5 and the nameplate 7 is disposed over the moisture detecting unit 6 and closing the step-shaped slot 52. The nameplate 7 can be transparent so that the degree of moisture detected by the moisture detecting unit 6 can be observed. The nameplate 7 can also be used to display trademarks, patterns, etc.

While in use, the sleeve body 1 for absorbing moisture from lenses is mounted to the lens A and a plurality of protruding ribs 131 on the inner surface of the lower space 13 are in contact with and fit around the periphery of the lens A so as to form the air channels 132 between the two adjacent protruding ribs 131. When there is some moisture in the lens A, the moisture passes through the air channels 132, the through holes 111 and the filter paper 3 to be absorbed by the moisture absorption material 4 in the mounting cavity 21. Through the insertion holes 521 of the upper cover 5, the moisture detecting unit 6 detects varying degrees of moisture in the moisture absorption material 4. Then users can determine whether the the moisture-absorbing member 24 is replaced or returned to the original condition according to the condition the moisture detecting unit 6 displays. Thereby the moisture-absorbing member 24 is always ready to use for drawing moisture out and dehumidification.

According to the above embodiments, the present invention has the following advantages compared with the techniques available now.

1. By the air channels formed by a plurality of protruding ribs on the lower space of the sleeve body for allowing air inside to flow, the moisture absorption range of the moisture absorption material is extending to the periphery of the lens. Then moisture in the lens is absorbed through gaps of the lens end, the focus ring, and the iris ring of the lens effectively for prevention of mold growth.
2. By the moisture absorption material mounted in the sleeve body, moisture in the lens is removed effectively. The moisture absorption material keeps working for long term dehumidification and drying.
3. Users can learn the level of moisture in the sleeve body by looking the moisture detecting unit in the upper cover at a glance. Thus the moisture absorption material can be replaced or regenerated in time to have optimal performance in moisture removal and keeping the lens dry.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalent.

What is claimed is:

1. A sleeve for absorbing moisture from lenses comprising:
   a sleeve body which includes a partition disposed on one end for dividing the sleeve body into an upper space and a lower space and the partition provided with a plurality of through holes communicating with the upper space and the lower space; the lower space made of elastic material providing a stretchable space to have a tight fit on a lens;
   a mounting cavity mounted in the upper space of the sleeve body;
   a moisture absorption material which is mounted in the mounting cavity; and
   an upper cover which covers an open end of the mounting cavity.

2. The device as claimed in claim 1, wherein a plurality of protruding ribs are mounted to an inner surface of the lower space of the sleeve body and an air channel forms between the two adjacent protruding ribs while the air channels communicate with the upper space by the through holes of the partition.

3. The device as claimed in claim 1, wherein a seal ring is arranged around an opening of the lower space of the sleeve body.

4. The device as claimed in claim 1, wherein the mounting cavity is disposed on a seat which is provided with an opening at a bottom side.

5. The device as claimed in claim 1, wherein the moisture absorption material is a block formed by molding of porous powder blended with adhesives.

6. The device as claimed in claim 1, wherein the lower space of the sleeve body is made of elastic material selected from the group consisting of silicone and rubber.

7. The device as claimed in claim 1, wherein a moisture detecting unit disposed on the upper cover is a small piece with a chemical agent which changes color in response to moisture.

8. The device as claimed in claim 1, wherein a moisture detecting unit disposed on the upper cover is a moisture meter for detecting degree of moisture in the moisture absorption material.

9. The device as claimed in claim 1, wherein the sleeve for absorbing moisture from lenses further includes a filter paper covering the through holes of the partition for preventing dust of the moisture absorption material from falling into the lower space through the through holes.

10. The device as claimed in claim 2, wherein a seal ring is arranged around an opening of the lower space of the sleeve body.

11. The device as claimed in claim 2, wherein the mounting cavity is disposed on a seat which is provided with an opening at a bottom side.

12. The device as claimed in claim 2, wherein the moisture absorption material is a block formed by molding of porous powder blended with adhesives.

13. The device as claimed in claim 2, wherein the lower space of the sleeve body is made of elastic material selected from the group consisting of silicone and rubber.

14. The device as claimed in claim 2, wherein a moisture detecting unit disposed on the upper cover is a small piece with a chemical agent which changes color in response to moisture.

15. The device as claimed in claim 4, wherein the sleeve for absorbing moisture from lenses further includes a filter paper covering the opening on the bottom side of the seat for preventing dust of the moisture absorption material from falling into the lower space through the opening.

16. The device as claimed in claim 11, wherein the sleeve for absorbing moisture from lenses further includes a filter paper covering the opening on the bottom side of the seat for preventing dust of the moisture absorption material from falling into the lower space through the opening.

\* \* \* \* \*